(12) United States Patent
Patankar et al.

(10) Patent No.: US 11,463,922 B2
(45) Date of Patent: Oct. 4, 2022

(54) MULTI-SUBSCRIPTION MEASUREMENT REPORTING

(71) Applicant: QUALCOMM Incorporated, San Diego, CA (US)

(72) Inventors: Kedar Patankar, Hyderabad (IN); Bapineedu Chowdary Gummadi, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/949,489

(22) Filed: Oct. 30, 2020

(65) Prior Publication Data

US 2022/0141723 A1    May 5, 2022

(51) Int. Cl.
  *H04W 36/00*  (2009.01)
  *H04W 36/30*  (2009.01)
  *H04W 36/08*  (2009.01)
  *H04W 24/10*  (2009.01)

(52) U.S. Cl.
  CPC ....... *H04W 36/0058* (2018.08); *H04W 24/10* (2013.01); *H04W 36/0088* (2013.01); *H04W 36/08* (2013.01); *H04W 36/30* (2013.01)

(58) Field of Classification Search
  CPC ......... H04W 36/0058; H04W 36/0088; H04W 36/08; H04W 36/30; H04W 24/10
  USPC .................................................. 455/436–448
  See application file for complete search history.

(56) References Cited

U.S. PATENT DOCUMENTS

| | | | |
|---|---|---|---|
| 2013/0315119 A1* | 11/2013 | Tabet ................ | H04W 52/0216 370/329 |
| 2014/0200002 A1* | 7/2014 | Vangala ................ | H04W 36/32 455/436 |
| 2018/0027466 A1* | 1/2018 | Trott ................ | H04W 36/0079 455/437 |
| 2021/0014667 A1* | 1/2021 | Lovlekar ........... | H04W 52/0216 |
| 2021/0044993 A1* | 2/2021 | Jha ........................ | H04W 76/15 |

* cited by examiner

*Primary Examiner* — Joel Ajayi

(57) ABSTRACT

Various aspects of the present disclosure generally relate to wireless communication. In some aspects, a user equipment (UE) may tune away from a first wireless network associated with a first subscription of the UE to a second wireless network associated with a second subscription of the UE. The UE may transmit, after tuning back to the first wireless network, a measurement report, outside of a scheduled measurement reporting occasion for the first wireless network. Numerous other aspects are provided.

30 Claims, 8 Drawing Sheets

MULTI-SUBSCRIPTION MEASUREMENT REPORTING

FIELD OF THE DISCLOSURE

Aspects of the present disclosure generally relate to wireless communication and to techniques and apparatuses for multi-subscription measurement reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes tuning away from a first wireless network associated with a first subscription of the UE to a second wireless network associated with a second subscription of the UE; and transmitting, after tuning back to the first wireless network, a measurement report, outside of a scheduled measurement reporting occasion for the first wireless network.

In some aspects, a method of wireless communication performed by a base station includes transmitting, to a UE, a configuration for measuring a signal associated with a target cell; and receiving, from the UE and outside of a scheduled measurement reporting occasion for the base station, a measurement report based at least in part on the configuration.

In some aspects, a UE for wireless communication includes a memory and one or more processors operatively coupled to the memory, the memory and the one or more processors configured to tune away from a first wireless network associated with a first subscription of the UE to a second wireless network associated with a second subscription of the UE; and transmit, after tuning back to the first wireless network, a measurement report, outside of a scheduled measurement reporting occasion for the first wireless network.

In some aspects, a base station for wireless communication includes a memory and one or more processors operatively coupled to the memory, the memory and the one or more processors configured to transmit, to a UE, a configuration for measuring a signal associated with a target cell; and receive, from the UE and outside of a scheduled measurement reporting occasion for the base station, a measurement report based at least in part on the configuration.

In some aspects, a non-transitory computer-readable medium storing a set of instructions for wireless communication includes one or more instructions that, when executed by one or more processors of a UE, cause the UE to tune away from a first wireless network associated with a first subscription of the UE to a second wireless network associated with a second subscription of the UE; and transmit, after tuning back to the first wireless network, a measurement report, outside of a scheduled measurement reporting occasion for the first wireless network.

In some aspects, a non-transitory computer-readable medium storing a set of instructions for wireless communication includes one or more instructions that, when executed by one or more processors of a base station, cause the base station to transmit, to a UE, a configuration for measuring a signal associated with a target cell; and receive, from the UE and outside of a scheduled measurement reporting occasion for the base station, a measurement report based at least in part on the configuration.

In some aspects, an apparatus for wireless communication includes means for tuning away from a first wireless network associated with a first subscription of the apparatus to a second wireless network associated with a second subscription of the apparatus; and means for transmitting, after tuning back to the first wireless network, a measurement report, outside of a scheduled measurement reporting occasion for the first wireless network.

In some aspects, an apparatus for wireless communication includes means for transmitting, to a UE, a configuration for measuring a signal associated with a target cell; and means for receiving, from the UE and outside of a scheduled measurement reporting occasion for the base station, a measurement report based at least in part on the configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
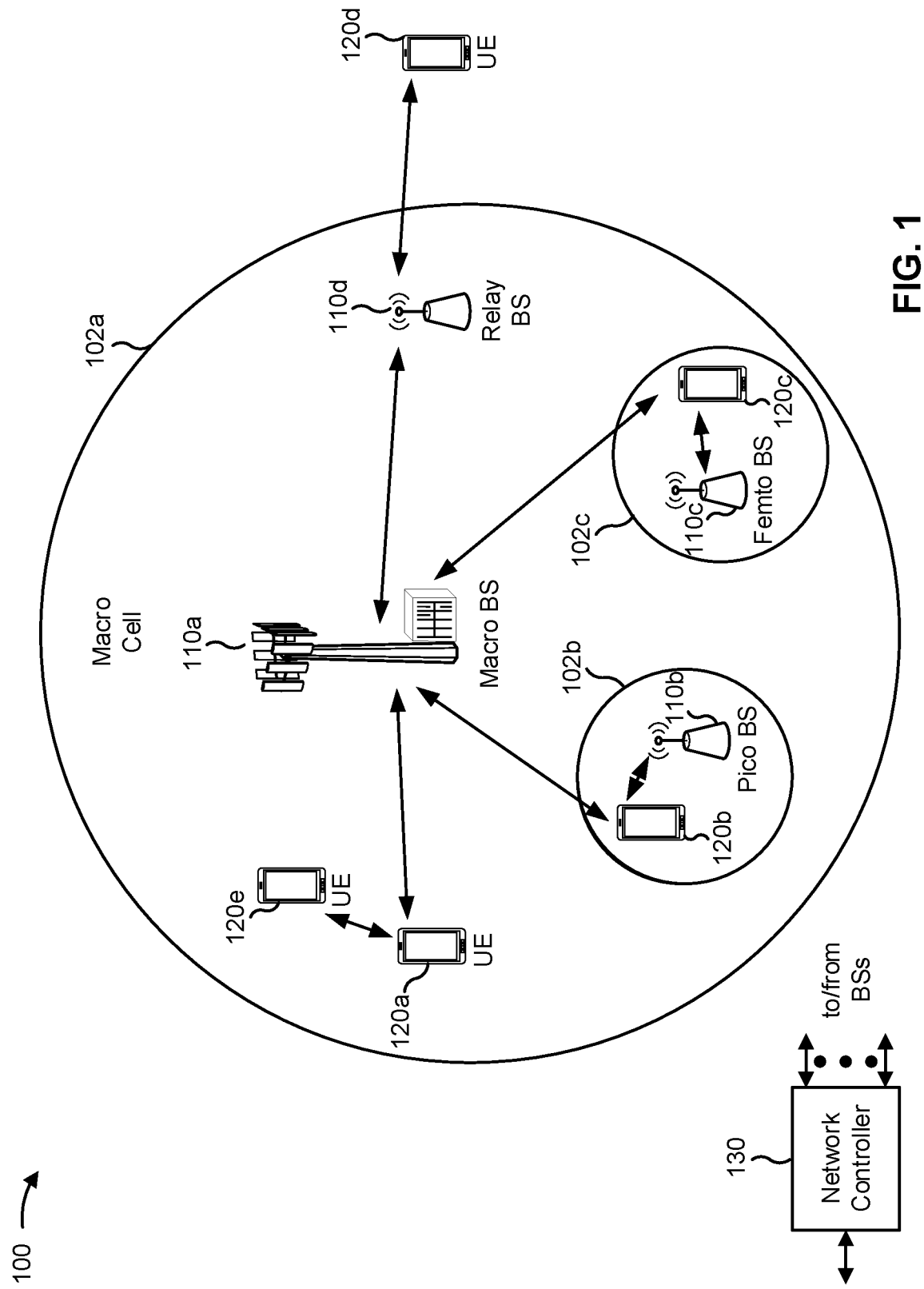
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102 a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
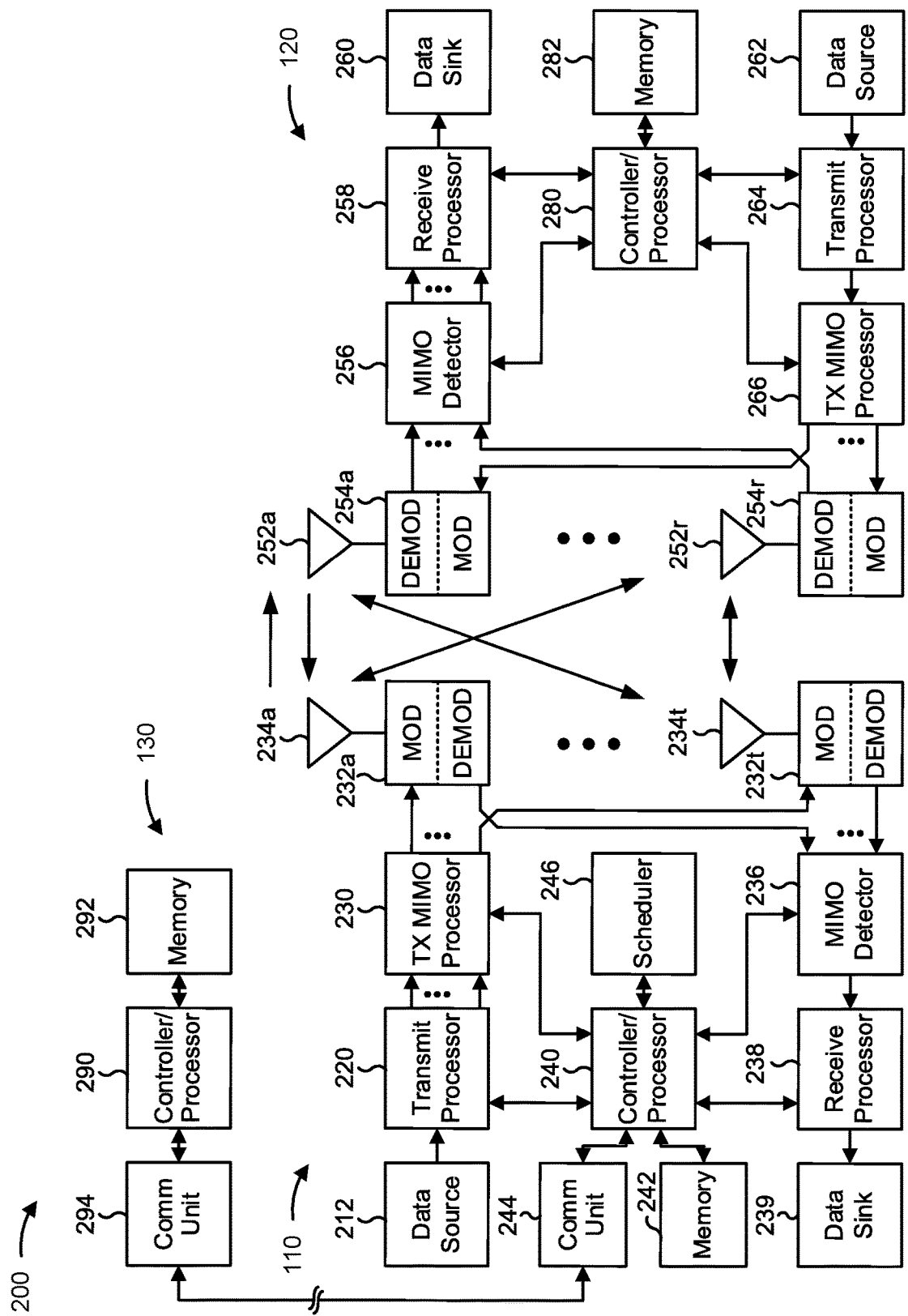
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-6.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-6.

Controller/processor 240 of base station 110, controller/processor 280 of UE 120, and/or any other component(s) of FIG. 2 may perform one or more techniques associated with multi-subscription measurement reporting, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, interpreting the instructions, and/or the like.

In some aspects, a UE (e.g., UE 120 of FIG. 1, multi-SIM UE 120 of FIGS. 3 and 4, and/or apparatus 700 of FIG. 7) may include means for tuning away from a first wireless network associated with a first subscription of the UE to a second wireless network associated with a second subscription of the UE; and/or means for transmitting, after tuning back to the first wireless network, a measurement report, outside of a scheduled measurement reporting occasion for the first wireless network. The means for the UE to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE may further include means for receiving, based at least in part on transmitting the measurement report, a handover command or a message to add a cell.

In some aspects, the UE may further include means for measuring, after tuning back to the first wireless network, a signal to generate the measurement report. In some aspects, the UE may further include means for determining whether to generate the measurement report from previous measurements or to measure, after tuning back to the first wireless network, a signal for generating the measurement report, based at least in part on one or more of:

In some aspects, a base station (e.g., base station 110 of FIG. 1, base station 310a of FIGS. 3 and 4, and/or apparatus 800 of FIG. 8) may include means for transmitting, to a UE (e.g., UE 120 of FIG. 1, multi-SIM UE 120 of FIGS. 3 and 4, and/or apparatus 700 of FIG. 7), a configuration for measuring a signal associated with a target cell; and/or means for receiving, from the UE and outside of a scheduled measurement reporting occasion for the base station, a measurement report based at least in part on the configuration. The means for the base station to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, the base station may further include means for transmitting, based at least in part on receiving the measurement report, a handover command or a message to add a cell.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
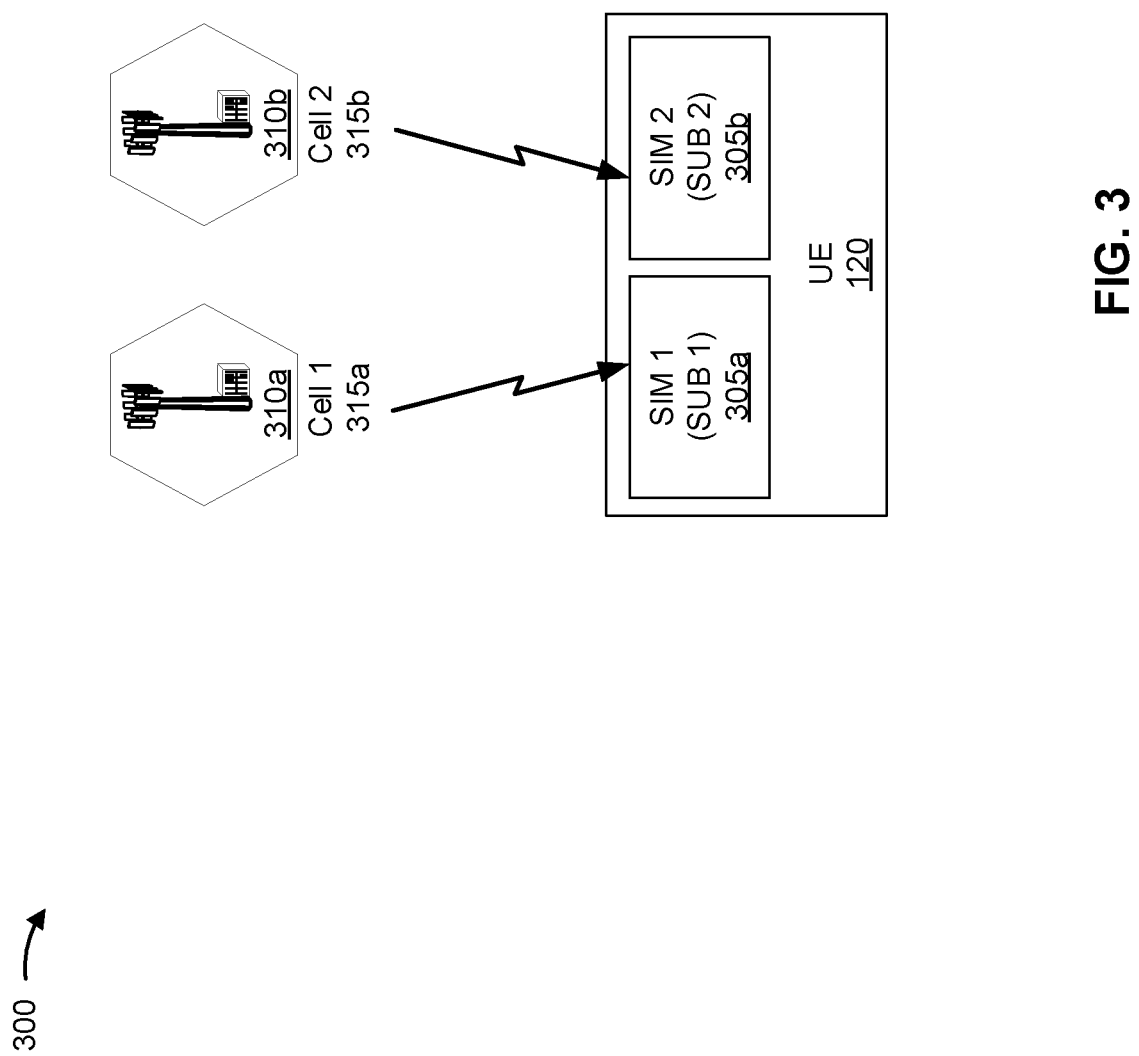
FIG. 3 is a diagram illustrating an example of a multi-subscriber identity module (SIM) UE, in accordance with various aspects of the present disclosure.

FIG. 3 is a diagram illustrating an example 300 of a multi-subscriber identity module (SIM) UE, in accordance with various aspects of the present disclosure. As shown in FIG. 3, a UE 120 may be a multiple SIM (multi-SIM) UE that includes multiple SIMs (two or more SIMs), shown as a first SIM 305a and a second SIM 305b. The first SIM 305a may be associated with a first subscription (shown as SUB 1), and the second SIM 305b may be associated with a second subscription (shown as SUB 2). A subscription may include a subscription with a network operator (for example, a mobile network operator (MNO)) that enables the UE 120 to access a wireless network (for example, a radio access network (RAN)) associated with the network operator.

A SIM 305 may be a removable SIM (for example, a SIM card) or an embedded SIM. A SIM 305 may include an integrated circuit that securely stores an international mobile subscriber identity (IMSI) and a security key, which are used to identify and authenticate a corresponding subscription associated with the SIM 305. In some cases, a SIM 305 may store a list of services that the UE 120 has permission to access using a subscription associated with the SIM 305, such as a data service or a voice service, among other examples.

As further shown in FIG. 3, the UE 120 may communicate (for example, in a connected mode, an idle mode, or an inactive mode) with a first base station 310a via a first cell 315a (shown as Cell 1) using the first SIM 305a. In this case, a first subscription (SUB 1) of the UE 120 may be used to access the first cell 315a (for example, using a first IMSI for UE identification, using a first security key for UE authentication, using a first list of services that the UE 120 is permitted to access using the first subscription, or by counting data or voice usage on the first cell against the first subscription, among other examples). Similarly, the UE 120 may communicate (for example, in a connected mode, an idle mode, or an inactive mode) with a second base station 310b via a second cell 315b (shown as Cell 2) using the second SIM 305b. In this case, a second subscription (SUB 2) of the UE 120 may be used to access the second cell 315b (for example, using a second IMSI for UE identification, using a second security key for UE authentication, using a second list of services that the UE 120 is permitted to access using the second subscription, or by counting data or voice usage on the second cell against the second subscription, among other examples).

The first base station 310a and/or the second base station 310b may include one or more of the base stations 110 described above in connection with FIG. 1. Although the first cell 315a and the second cell 315b are shown as being provided by different base stations, in some aspects, the first cell 315 and the second cell 315b may be provided by the same base station. Thus, in some aspects, the first base station 310a and the second base station 310b may be integrated into a single base station.

In some cases, the UE 120 may be a single receiver (SR) (sometimes also referred to as single radio) multi-SIM UE, such as an SR multi-SIM multiple standby (SR-MSMS) UE or a single receiver dual SIM dual standby (SR-DSDS) UE, among other examples. A multi-SIM UE may be capable of switching between two separate mobile network services, may include hardware for maintaining multiple connections (for example, one connection per SIM) in a standby state, or may include hardware (for example, multiple transceivers) for maintaining multiple network connections at the same time, among other examples. However, an SR-DSDS UE or an SR-MSMS UE may only be capable of receiving data on one connection at a time because radio frequency resources are shared between the multiple subscriptions. For example, an SR-DSDS UE or an SR-MSMS UE may be associated with multiple subscriptions but may include only a single transceiver shared by the multiple subscriptions, a single transmit chain shared by the multiple subscriptions, or a single receive chain shared by the multiple subscriptions, among other examples.

In some situations, a multi-subscription UE (e.g., a multi-SIM UE) may receive a request to perform a measurement (e.g., a MeasObj message via radio resource control (RRC) signaling as defined in 3GPP specifications and/or another similar request message) from a first base station serving a first cell associated with a first subscription of the UE. However, before performing the measurement and/or transmitting a report based on the measurement to the first base station, the UE may tune away to a second cell that is served by a second base station and associated with a second subscription of the UE. For example, the UE may respond to a paging message received during a paging occasion associated with the second subscription. Accordingly, the first base station may remove an object corresponding to the request (e.g., a TechObj object as defined in 3GPP specifications and/or another similar object) such that, after the UE tunes back to the first cell, the first base station may retransmit the measurement request. Additionally, or alternatively, the UE may transmit the measurement report at a next configured measurement reporting occasion. Accordingly, the first base station and the UE may experience latency in fulfilling the measurement request. This latency may degrade network quality and speed by delaying a handover command or a cell add command, from the first wireless network, to the UE.

Similarly, the UE may tune away after transmitting the report but before receiving a handover command or a cell add command, based on the report, from the first wireless network. Accordingly, the UE will not receive the handover command or the cell add command, and the first base station may retransmit the measurement request when the UE tunes back. Additionally, or alternatively, the UE may retransmit the measurement report, after tuning back, at a next configured measurement reporting occasion. This results in latency that may degrade network quality and speed by delaying the handover command or the cell add command.

Some techniques and apparatuses described herein may provide for a multi-subscription UE (e.g., multi-SIM UE 120) to transmit a measurement report to a first base station (e.g., base station 310a) serving a first cell (e.g., cell 315a) associated with a first subscription (e.g., SUB 1 identified by first SIM 305a) of the UE 120 outside of a scheduled measurement reporting occasion for a first wireless network including the first cell 315a. Accordingly, the measurement report may be included in a first transmission (e.g., in time) for the UE 120 after the UE 120 tunes back to the first wireless network from a second wireless network including a second cell (e.g., cell 315b) that is served by a second base station (e.g., base station 310b) and associated with a second subscription (e.g., SUB 2 identified by second SIM 305b). Techniques and apparatuses described herein may therefore reduce latency in fulfilling a measurement request from the first wireless network after tuning back from the second wireless network, which may improve network quality and speed (e.g., by speeding up a handover command or a cell add command, from the first wireless network, to the UE 120).

As indicated above, FIG. 3 is provided as an example. Other examples may differ from what is described with regard to FIG. 3.

Figure 4:
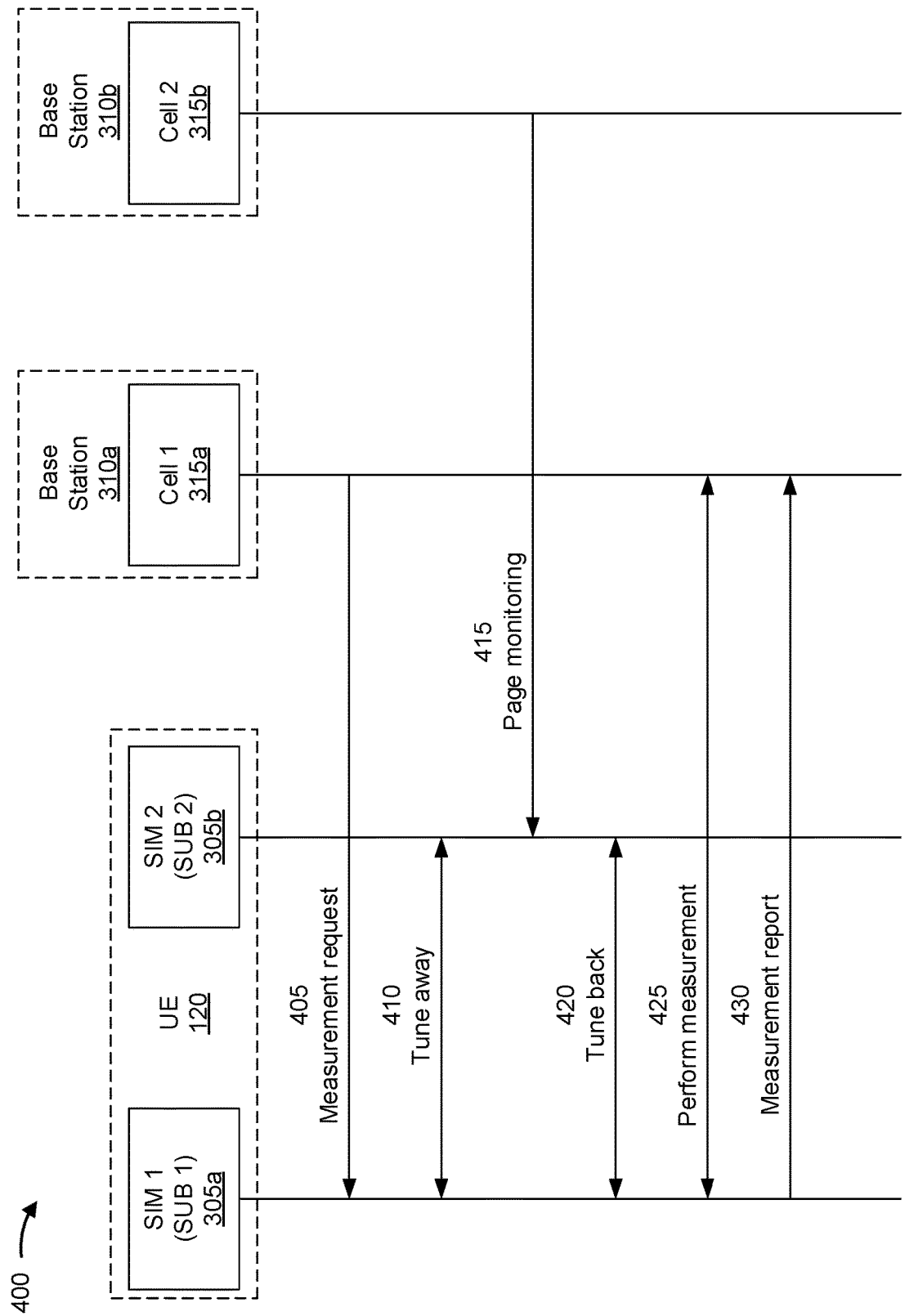
FIG. 4 is a diagram illustrating an example associated with multi-subscription measurement reporting, in accordance with various aspects of the present disclosure.

FIG. 4 is a diagram illustrating an example 400 associated with multi-subscription measurement reporting, in accordance with various aspects of the present disclosure. FIG. 4 shows an example call flow where a multi-subscriber UE 120 transmits a measurement report, to a first wireless network, after tuning back from a second wireless network and outside of a scheduled measurement reporting occasion for the first wireless network. As shown in FIG. 4, the UE 120 may be a multi-SIM UE that includes multiple SIMs, shown as a first SIM 305a and a second SIM 305b (e.g., as described above in connection with FIG. 3). As also described above, the first SIM 305a may be associated with a first subscription (shown as SUB 1), and the second SIM 305b may be associated with a second subscription (shown as SUB 2). Although the description below will focus on multiple SIMs, the description applies equally to any other techniques for associating a plurality of subscriptions with the UE 120, such as embedded SIMs, virtual SIMs, other techniques for storing different IMSIs, and/or the like. Moreover, although the description below will focus on two subscriptions, the description similarly applies to other numbers of subscriptions for the UE 120.

As further shown in FIG. 4, the UE 120 may communicate with a first base station 310a via a first cell 315a (shown as Cell 1) using the first SIM 305a, and the UE 120 may communicate with a second base station 310b via a second cell 315b (shown as Cell 2) using the second SIM 305b (e.g., as described above in connection with FIG. 3). In example 400, the first base station 310a and the second base station 310b are shown as separate base stations 110; however, in some aspects, the first base station 310a and the second base station 310b may be integrated into a single base station 110 (e.g., as described above in connection with FIG. 1). In some aspects, the first cell 315a may be included in the first wireless network, and the second cell 315b may be included in the second wireless network.

As shown in connection with reference number 405, the base station 310a may transmit, and the UE 120 may receive, a request to perform a measurement (e.g., a MeasObj message via RRC signaling as defined in 3GPP specifications and/or another similar request message). In some aspects, the base station 310a may request a measurement for another cell, such as a neighboring cell. For example, the measurement may be associated with a target cell that includes an NR cell or a legacy cell (e.g., an LTE cell and/or another legacy cell). In some aspects, the target cell may be for a non-standalone (NSA) network anchored by the first wireless network. As an alternative, the target cell may be for a cell addition (e.g., as a secondary cell) command and/or a handover command (e.g., a different cell in the first wireless network).

As shown in connection with reference number 410, the UE 120 may tune away from the first wireless network associated with the first subscription (e.g., SUB 1) of the UE 120 to the second wireless network associated with the second subscription (e.g., SUB 2) of the UE 120. For example, the UE 120 may tune away to monitor a paging occasion associated with the second subscription.

As shown in connection with reference number 415, the UE 120 may monitor a paging occasion associated with the second subscription (e.g., SUB 2). In some aspects, the UE 120 may receive a paging message when monitoring the paging occasion associated with the second subscription.

As shown in connection with reference number 420, the UE 120 may tune back to the first wireless network associated with the first subscription (e.g., SUB 1) of the UE 120. For example, the UE 120 may re-establish an RRC connection with the base station 310a.

In some aspects, the UE 120 may receive no paging message when monitoring the paging occasion associated with the second subscription. Accordingly, in some aspects, the UE 120 may proceed from one or more steps associated with reference number 410 to one or more steps associated with reference number 420. As an alternative, the UE 120 may tune back after determining that a paging message, received when monitoring the paging occasion associated with the second subscription, is not intended for the UE 120. For example, the UE 120 may decode a control message (e.g., on a physical downlink control channel (PDCCH) and/or another downlink channel) and determine that the control message does not include an identifier (e.g., a radio network temporary identifier (RNTI), a temporary mobile subscriber identity (TMSI), and/or another identifier) associated with the UE 120. As another alternative, the UE 120 may tune back after responding to the paging message. For example, the UE 120 may decode a control message (e.g., on a PDCCH and/or another downlink channel) and determine that the control message includes an identifier (e.g., an RNTI, a TMSI, and/or another identifier) associated with the UE 120. Accordingly, the UE 120 may receive data (e.g., on a physical downlink shared channel (PDSCH) and/or another downlink channel) and/or transmit data (e.g., on a physical uplink shared channel (PUSCH) and/or another uplink channel) based at least in part on decoding the control message.

As shown in connection with reference number 425, the UE 120 may measure, after tuning back to the first wireless network, a signal to generate the measurement report. For example, the UE 120 may measure an RSRP, an RSRQ, a signal-to-noise-and-interference ratio (SINR), and/or another indicator of a strength of the signal. In some aspects, the signal may include at least one reference signal from a target cell. For example, the at least one reference signal may include a synchronization signal (e.g., a synchronization signal block (SSB) and/or another synchronization signal), a channel state information reference signal (CSI-RS), and/or another reference signal. The UE 120 may generate a measurement report based at least in part on measuring the signal.

As shown in connection with reference number 430, and after tuning back to the first wireless network, the UE 120 may transmit, and the base station 310*a* may receive, the measurement report, outside of a scheduled measurement reporting occasion for the first wireless network. For example, the UE 120 may transmit the measurement report using a random access channel (RACH) established with the base station 310*a* while tuning back.

In some aspects, the UE 120 may have generated the measurement report before tuning away from the first wireless network. Accordingly, in some aspects, the UE 120 may proceed from one or more steps associated with reference number 420 to one or more steps associated with reference number 430.

In some aspects, the UE 120 may have already transmitted the measurement report, to the base station 310*a*, one or more times, before tuning away from the first wireless network. For example, the UE 120 may have transmitted the report but tuned away before receiving, from the base station 310*a*, a handover command or a message to add a cell (e.g., as described below), based at least in part on the report. Accordingly, in some aspects, the UE 120 may proceed from one or more steps associated with reference number 420 to one or more steps associated with reference number 430. For example, the UE 120 may retransmit the measurement report in order to trigger a retransmission, from the base station 310*a*, of the handover command or the message to add a cell, because one or more initial transmission of the handover command or the message to add a cell were lost when the UE 120 tuned away.

As an alternative, and as described above in connection with reference number 425, the UE 120 may generate the measurement after tuning back to the first wireless network. Accordingly, the UE 120 may measure at least one reference signal from the target cell after tuning back to the first wireless network.

In some aspects, the UE 120 may determine, after tuning back to the first wireless network, whether to transmit a previously generated measurement report (e.g., to proceed from one or more steps associated with reference number 420 to one or more steps associated with reference number 430, as described above) or to perform a new measurement (e.g., as described in connection with reference number 425). In some aspects, the UE 120 may make this determination based at least in part on one or more of a measurement periodicity associated with the first subscription, a measurement periodicity associated with the second subscription, a number of previously transmitted measurement reports, a duration associated with the tuning away, a signal strength of a serving cell for the first wireless network, a signal strength of a target cell for the first wireless network, a signal strength of a neighboring cell of the first wireless network, or a number of downlink acknowledgments received on the serving cell. For example, the UE 120 may determine to perform a new measurement when the measurement periodicity associated with the first subscription results in a next measurement occasion that is within a threshold time of the tune back.

In another example, the UE 120 may determine to transmit a previously generated measurement report when the measurement periodicity associated with the second subscription results in a next measurement occasion that is within a threshold time of the tune back. In yet another example, the UE 120 may determine to perform a new measurement when a number of previously transmitted measurement reports satisfies a threshold (e.g., such that a maximum number of retransmissions has been reached or is within a threshold number of retransmissions). In another example, the UE 120 may determine to perform a new measurement when a duration associated with the tuning away satisfies a threshold (e.g., is larger than 10 ms, 50 ms, and/or another threshold). In yet another example, the UE 120 may determine to transmit a previously generated measurement report when a signal strength of a serving cell (e.g., first cell 315*a*) for the first wireless network satisfies a threshold.

In another example, the UE 120 may determine to perform a new measurement when a signal strength of a target cell for the first wireless network satisfies a threshold. In yet another example, the UE 120 may determine to perform a new measurement when a signal strength of a neighboring cell for the first wireless network satisfies a threshold. In another example, the UE 120 may determine to transmit a previously generated measurement report when a number of downlink acknowledgments received on the serving cell (e.g., first cell 315*a*) satisfies a threshold (e.g., such that a new measurement request is less likely to be received and decoded).

In some aspects, the UE 120 may make the determination based at least in part on a combination of factors. In some aspects, the UE 120 may prioritize one or more factors over one or more additional factors. For example, the UE 120 may determine to transmit a previously generated measurement report when a next measurement occasion associated with the second subscription is within a corresponding threshold time of the tune back even when a next measurement occasion associated with the first subscription is within a corresponding threshold time of the tune back. In another example, the UE 120 may determine to perform a new measurement when a signal strength of a target cell for the first wireless network satisfies a corresponding threshold even when a signal strength of a serving cell (e.g., first cell 315*a*) for the first wireless network satisfies a corresponding threshold.

In yet another example, the UE 120 may determine to perform a new measurement when a duration associated with the tuning away satisfies a corresponding threshold (e.g., is larger than 10 ms, 50 ms, and/or another threshold) even when a next measurement occasion associated with the second subscription is within a corresponding threshold time of the tune back. Additionally, or alternative, the UE 120 may use two or more factors to make the determination. For example, the UE 120 may determine to perform a new measurement when a duration associated with the tuning away satisfies a corresponding threshold (e.g., is larger than 10 ms, 50 ms, and/or another threshold) and a next measurement occasion associated with the first subscription is within a corresponding threshold time of the tune back.

In another example, the UE 120 may determine to transmit a previously generated measurement report when a number of downlink acknowledgments received on the serving cell (e.g., first cell 315*a*) satisfies a corresponding threshold and a next measurement occasion associated with the second subscription is within a corresponding threshold time of the tune back. In yet another example, the UE 120 may determine to perform a new measurement when a signal strength of a target cell for the first wireless network satisfies a corresponding threshold and a number of previously transmitted measurement reports satisfies a corresponding threshold.

Accordingly, the measurement report may be included in a first transmission in time for the UE 120 after tuning back to the first wireless network. For example, the measurement report may be the first message transmitted, to the base station 310*a*, on a RACH and/or another channel established while tuning back. Accordingly, the measurement report may be the first message transmitted after re-establishing an RRC connection with the base station 310*a*.

In some aspects, and as described above, the measurement report may be associated with a target cell, for addition or handover, within the first wireless network. Accordingly, the base station 310*a* may transmit, and the UE 120 may receive, based at least in part on transmitting the measurement report, a handover command or a message to add a cell. The UE 120 may add a new cell (e.g., as an NSA network and/or as a secondary cell) or execute a handover (e.g., to a target cell within the first wireless network) based at least in part on the message to add a cell or the handover command, respectively.

By using the techniques described in connection with FIG. 4, the UE 120 and the base station 310*a* may reduce latency in fulfilling a measurement request from the first wireless network after tuning back from the second wireless network. Accordingly, the UE 120 and the base station 310*a* may improve network quality and speed (e.g., by speeding up a handover command or a cell add command, from the first wireless network, to the UE 120).

As indicated above, FIG. 4 is provided as an example. Other examples may differ from what is described with respect to FIG. 4.

Figure 5:
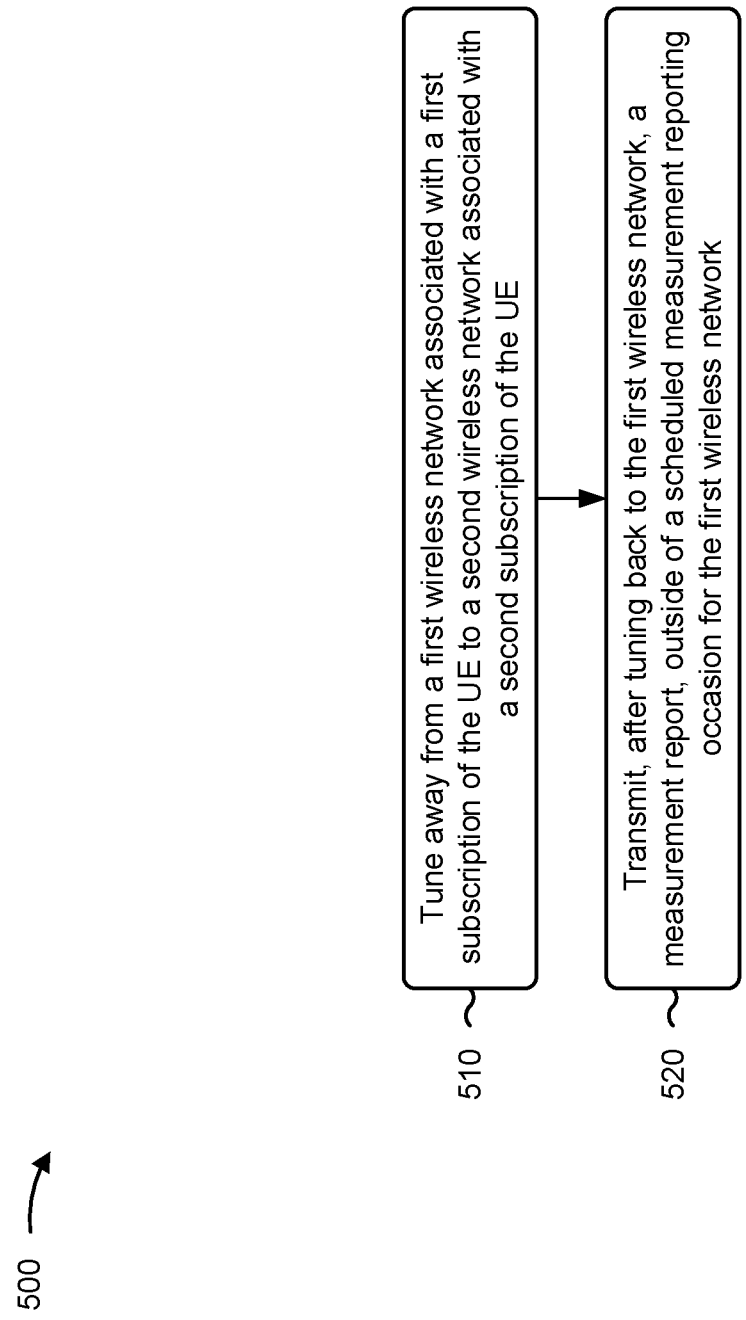
FIGS. 5 and 6 are diagrams illustrating example processes associated with multi-subscription measurement reporting, in accordance with various aspects of the present disclosure.

FIG. 5 is a diagram illustrating an example process 500 performed, for example, by a UE, in accordance with various aspects of the present disclosure. Example process 500 is an example where the UE (e.g., multi-SIM UE 120 of FIGS. 3 and 4 and/or apparatus 700 of FIG. 7) performs operations associated with multi-subscription measurement reporting.

As shown in FIG. 5, in some aspects, process 500 may include tuning away from a first wireless network associated with a first subscription of the UE to a second wireless network associated with a second subscription of the UE (block 510). For example, the UE (e.g., using reception component 702 and/or transmission component 704, depicted in FIG. 7) may tune away from the first wireless network associated with the first subscription of the UE to the second wireless network associated with the second subscription of the UE, as described above.

As further shown in FIG. 5, in some aspects, process 500 may include transmitting, after tuning back to the first wireless network, a measurement report, outside of a scheduled measurement reporting occasion for the first wireless network (block 520). For example, the UE (e.g., using transmission component 704) may transmit, after tuning back to the first wireless network, the measurement report, outside of the scheduled measurement reporting occasion for the first wireless network, as described above.

Process 500 may include additional aspects, such as any single aspect or any combination of aspects described below and/or in connection with one or more other processes described elsewhere herein.

In a first aspect, the measurement report is included in a first transmission after tuning back to the first wireless network.

In a second aspect, alone or in combination with the first aspect, the measurement report is associated with a target cell that includes an NR cell or a legacy cell.

In a third aspect, alone or in combination with one or more of the first and second aspects, the target cell is for an NSA network anchored by the first wireless network.

In a fourth aspect, alone or in combination with one or more of the first through third aspects, the measurement report is associated with a target cell, for addition or handover, within the first wireless network.

In a fifth aspect, alone or in combination with one or more of the first through fourth aspects, process 500 further includes receiving (e.g., using reception component 702), based at least in part on transmitting the measurement report, a handover command or a message to add a cell.

In a sixth aspect, alone or in combination with one or more of the first through fifth aspects, the measurement report was generated by the UE before tuning away from the first wireless network.

In a seventh aspect, alone or in combination with one or more of the first through sixth aspects, process 500 further includes measuring (e.g., using reception component 702), after tuning back to the first wireless network, a signal to generate the measurement report.

In an eighth aspect, alone or in combination with one or more of the first through seventh aspects, the signal includes at least one reference signal from a target cell.

In a ninth aspect, alone or in combination with one or more of the first through eighth aspects, process 500 further includes determining (e.g., using determination component 708, depicted in FIG. 7) whether to generate the measurement report from previous measurements or to measure, after tuning back to the first wireless network, a signal for generating the measurement report, based at least in part on one or more of a measurement periodicity associated with the first subscription, a measurement periodicity associated with the second subscription, a number of previously transmitted measurement reports, a duration associated with the tuning away, a signal strength of a serving cell for the first wireless network, a signal strength of a target cell for the first wireless network, a signal strength of a neighboring cell of the first wireless network, or a number of downlink acknowledgments received on the serving cell.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
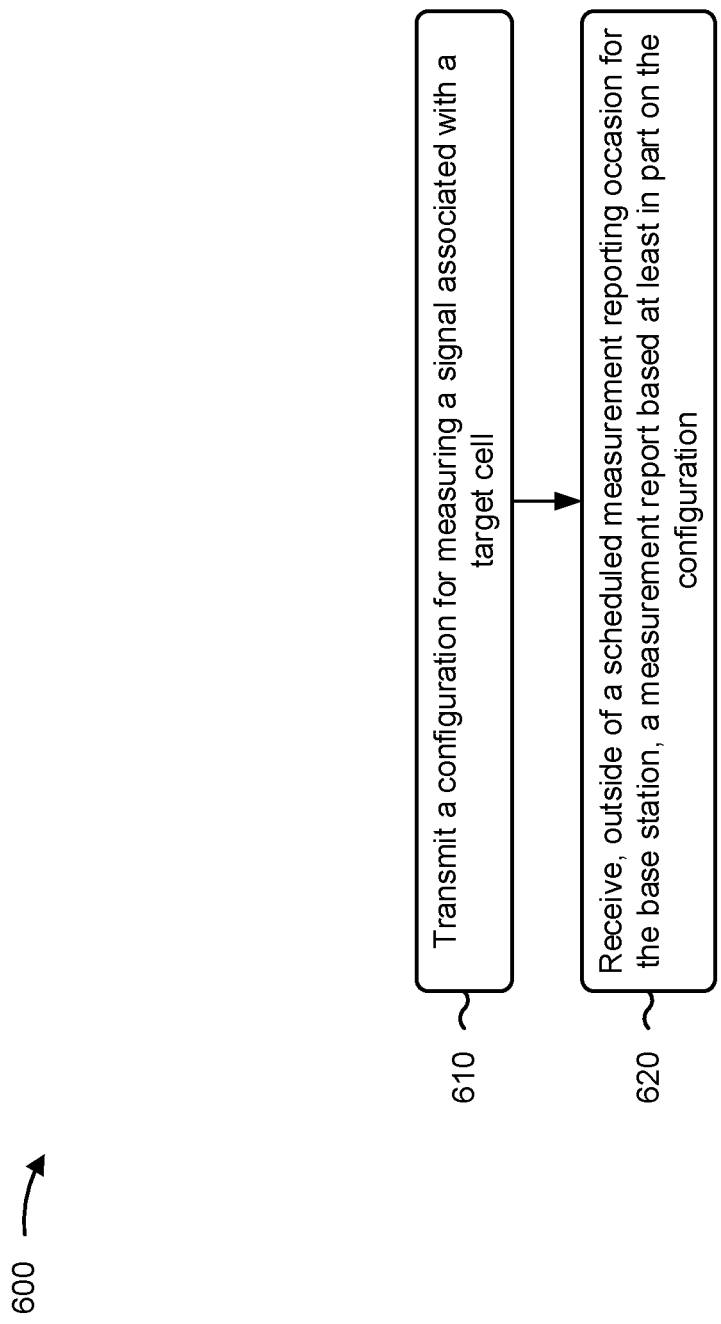

FIG. 6 is a diagram illustrating an example process 600 performed, for example, by a base station, in accordance with various aspects of the present disclosure. Example process 600 is an example where the base station (e.g., base station 310*a* of FIGS. 3 and 4 and/or apparatus 800 of FIG. 8) performs operations associated with multi-subscription measurement reporting.

As shown in FIG. 6, in some aspects, process 600 may include transmitting, to a UE (e.g., multi-SIM UE 120 of FIGS. 3 and 4 and/or apparatus 700 of FIG. 7), a configuration for measuring a signal associated with a target cell (block 610). For example, the base station (e.g., using transmission component 804, depicted in FIG. 8) may transmit, to the UE, the configuration for measuring the signal associated with the target cell, as described above.

As further shown in FIG. 6, in some aspects, process 600 may include receiving, from the UE and outside of a scheduled measurement reporting occasion for the base station, a measurement report based at least in part on the configuration (block 620). For example, the base station (e.g., using reception component 802, depicted in FIG. 8) may receive, from the UE and outside of the scheduled measurement reporting occasion for the base station, the measurement report based at least in part on the configuration, as described above.

Process 600 may include additional aspects, such as any single aspect or any combination of aspects described below and/or in connection with one or more other processes described elsewhere herein.

In a first aspect, the measurement report is included in a first transmission from the UE after the UE has tuned back to a wireless network that includes the base station.

In a second aspect, alone or in combination with the first aspect, the target cell is an NR cell or a legacy cell.

In a third aspect, alone or in combination with one or more of the first and second aspects, the target cell is for an NSA network anchored by a wireless network that includes the base station.

In a fourth aspect, alone or in combination with one or more of the first through third aspects, the measurement report is associated with a target cell, for handover or addition, within a wireless network that includes the base station.

In a fifth aspect, alone or in combination with one or more of the first through fourth aspects, process 600 further includes transmitting (e.g., using transmission component 804), based at least in part on receiving the measurement report, a handover command or a message to add a cell.

In a sixth aspect, alone or in combination with one or more of the first through fifth aspects, the signal includes at least one reference signal from the target cell.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
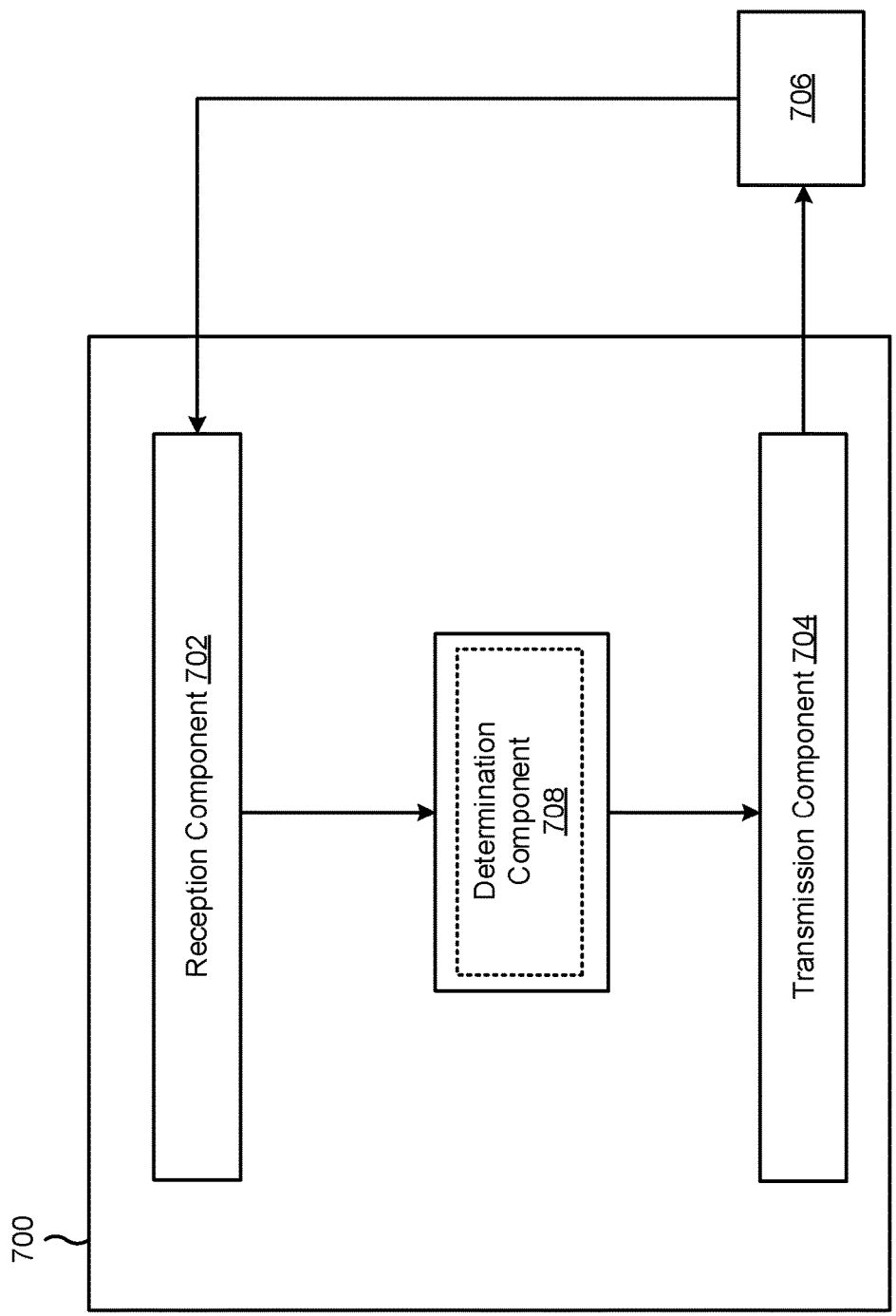
FIGS. 7 and 8 are block diagrams of example apparatuses for wireless communication, in accordance with various aspects of the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a determination component 708, among other examples.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5, or a combination thereof. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be collocated with the reception component 702 in a transceiver.

In some aspects, the reception component 702 and/or the transmission component 704 may tune away from a first wireless network associated with a first subscription of the apparatus 700 to a second wireless network associated with a second subscription of the apparatus 700. For example, the reception component 702 may receive a signal associated with a monitoring occasion for the second subscription and/or may monitor for paging messages during the monitoring occasion. Additionally, or alternatively, the transmission component 704 may transmit a message suspending or a connection with or disconnecting from (e.g., terminating an RRC connection with) the first wireless network. The transmission component 704 may transmit, after tuning back to the first wireless network, a measurement report, outside of a scheduled measurement reporting occasion for the first wireless network.

In some aspects, the reception component 702 may receive, based at least in part on the transmission component 704 transmitting the measurement report, a handover command or a message to add a cell.

In some aspects, the reception component 702 may measure, after tuning back to the first wireless network, a signal to generate the measurement report.

In some aspects, the determination component 708 may determine whether to generate the measurement report from previous measurements or to measure, after tuning back to the first wireless network, a signal for generating the measurement report, based at least in part on one or more of a measurement periodicity associated with the first subscription, a measurement periodicity associated with the second subscription, a number of previously transmitted measurement reports, a duration associated with the tuning away, a signal strength of a serving cell for the first wireless network, a signal strength of a target cell for the first wireless network, a signal strength of a neighboring cell of the first wireless network, or a number of downlink acknowledgments received on the serving cell. In some aspects, the determination component 708 may include a receive processor, a transmit MIMO processor, a transmit processor, a controller/processor, a memory, or a combination thereof, of the UE described above in connection with FIG. 2.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
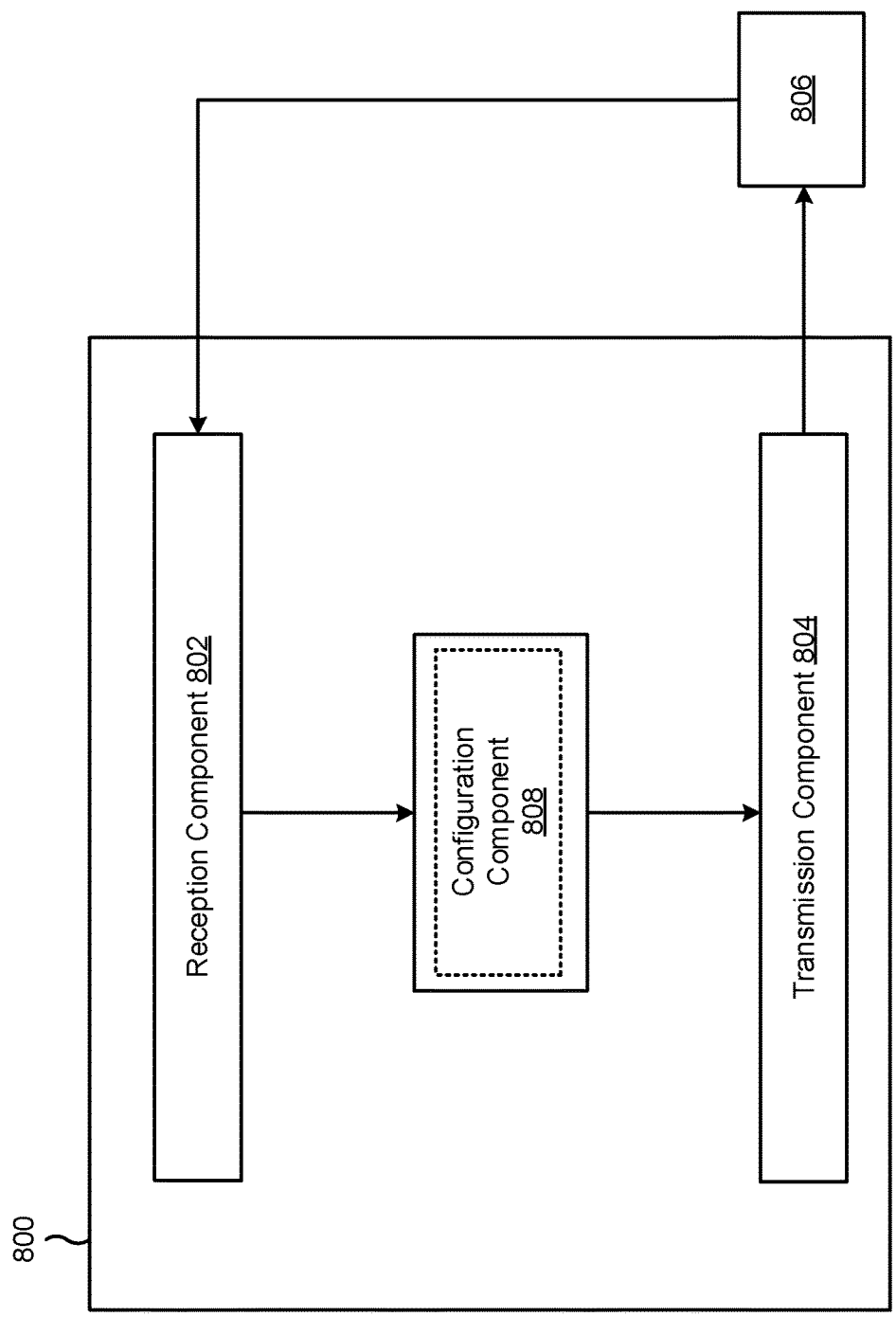

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a configuration component 808, among other examples.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be collocated with the reception component 802 in a transceiver.

In some aspects, the transmission component 804 may transmit, to the apparatus 806, a configuration for measuring a signal associated with a target cell. For example, the configuration component 808 may determine the configuration for measuring the signal associated with the target cell. In some aspects, the configuration component 808 may include a transmit MIMO processor, a transmit processor, a controller/processor, a memory, or a combination thereof, of the base station described above in connection with FIG. 2. The reception component 802 may receive, from the apparatus 806 and outside of a scheduled measurement reporting occasion for the base station, a measurement report based at least in part on the configuration.

In some aspects, transmission component 804 may transmit, based at least in part on the reception component 802 receiving the measurement report, a handover command or a message to add a cell.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a multi-subscriber identity module (multi-SIM) user equipment (UE), comprising:
  receiving, from an apparatus of a base station, a request to perform a measurement associated with a target cell;
  tuning away from a first wireless network associated with a first subscription of the multi-SIM UE to a second wireless network associated with a second subscription of the multi-SIM UE after receiving the request and based at least in part on a paging message received during a paging occasion associated with the second subscription;
  tuning back to the first wireless network after tuning away from the first wireless network;
  measuring, after tuning back to the first wireless network and based on the request, a reference signal from the target cell to generate a measurement report; and
  transmitting the measurement report to the apparatus of the base station, outside of a scheduled measurement reporting occasion for the first wireless network,
    wherein the measurement report is included in a first transmission in time after tuning back to the first wireless network.

2. The method of claim 1, wherein the target cell includes a New Radio (NR) cell or a legacy cell.

3. The method of claim 1, wherein the target cell is for a non-standalone network anchored by the first wireless network.

4. The method of claim 1, wherein the target cell is for addition or handover within the first wireless network.

5. The method of claim 1, further comprising:
  receiving, based at least in part on transmitting the measurement report, a handover command or a message to add a cell.

6. The method of claim 1, further comprising:
  determining to measure, after tuning back to the first wireless network, the reference signal for generating the measurement report, based at least in part on one or more of:
    a measurement periodicity associated with the first subscription,
    a measurement periodicity associated with the second subscription,
    a number of previously transmitted measurement reports,
    a duration associated with tuning away from the first wireless network,
    a signal strength of a serving cell for the first wireless network,
    a signal strength of a target cell for the first wireless network,
    a signal strength of a neighboring cell of the first wireless network, or
    a number of downlink acknowledgments received on the serving cell.

7. A multi-subscriber identity module (multi-SIM) user equipment (UE) for wireless communication, comprising:
  a memory; and
  one or more processors coupled to the memory and configured to cause the multi-SIM UE to:
    receive, from an apparatus of a base station, a request to perform a measurement associated with a target cell;

tune away from a first wireless network associated with a first subscription of the multi-SIM UE to a second wireless network associated with a second subscription of the multi-SIM UE after receiving the request and based at least in part on a paging message received during a paging occasion associated with the second subscription;
tune back to the first wireless network after tuning away from the first wireless network;
measure, after tuning back to the first wireless network and based on the request, a reference signal from the target cell to generate a measurement report; and
transmit the measurement report to the apparatus of the base station, outside of a scheduled measurement reporting occasion for the first wireless network,
wherein the measurement report is included in a first transmission in time after tuning back to the first wireless network.

8. The multi-SIM UE of claim 7, wherein the target cell includes a New Radio (NR) cell or a legacy cell.

9. The multi-SIM UE of claim 7, wherein the target cell is for a non-standalone network anchored by the first wireless network.

10. The multi-SIM UE of claim 7, wherein the target cell is for addition or handover within the first wireless network.

11. The multi-SIM UE of claim 7, wherein the one or more processors are further configured to cause the multi-SIM UE to:
receive, based at least in part on transmitting the measurement report, a handover command or a message to add a cell.

12. The multi-SIM UE of claim 7, wherein the one or more processors are further configured to cause the multi-SIM UE to:
determine to measure, after tuning back to the first wireless network, the reference signal for generating the measurement report, based at least in part on one or more of:
  a measurement periodicity associated with the first subscription,
  a measurement periodicity associated with the second subscription,
  a number of previously transmitted measurement reports,
  a duration associated with tuning away from the first wireless network,
  a signal strength of a serving cell for the first wireless network,
  a signal strength of a target cell for the first wireless network,
  a signal strength of a neighboring cell of the first wireless network, or
  a number of downlink acknowledgments received on the serving cell.

13. The method of claim 1, further comprising:
monitoring, based on tuning away from the first wireless network, another paging occasion associated with the second subscription; and
wherein tuning back to the first wireless network comprises:
  tuning back to the first wireless network based on no paging message being received when monitoring the other paging occasion associated with the second subscription.

14. The method of claim 1, further comprising:
monitoring, based on tuning away from the first wireless network, another paging occasion associated with the second subscription; and
wherein tuning back to the first wireless network comprises:
  tuning back to the first wireless network based on determining that another paging message, received when monitoring the other paging occasion associated with the second subscription, is not intended for the multi-SIM UE.

15. The multi-SIM UE of claim 7, wherein the one or more processors are further configured to cause the multi-SIM UE to:
monitor, based on tuning away from the first wireless network, another paging occasion associated with the second subscription; and
wherein the one or more processors, to tune back to the first wireless network, are configured to cause the multi-SIM UE to:
  tune back to the first wireless network based on no paging message being received when monitoring the other paging occasion associated with the second subscription.

16. The multi-SIM UE of claim 7, wherein the one or more processors are further configured to cause the multi-SIM UE to:
monitor, based on tuning away from the first wireless network, another paging occasion associated with the second subscription; and
wherein the one or more processors, to tune back to the first wireless network, are configured to cause the multi-SIM UE to:
  tune back to the first wireless network based on determining that another paging message, received when monitoring the other paging occasion associated with the second subscription, is not intended for the multi-SIM UE.

17. The method of claim 1, wherein the reference signal includes:
a synchronization signal block (SSB), and/or
a channel state information reference signal (CSI-RS).

18. The method of claim 1, wherein tuning back to the first wireless network comprises:
re-establishing an radio resource control (RRC) connection with the apparatus of the base station.

19. The multi-SIM UE of claim 7, wherein the multi-SIM UE is one of:
a single receiver (SR) multi-SIM multiple standby (SR-MSMS) UE, or
an SR dual SIM dual standby (SR-DSDS) UE.

20. The multi-SIM UE of claim 7, wherein the reference signal includes:
a synchronization signal block (SSB), and/or
a channel state information reference signal (CSI-RS).

21. The multi-SIM UE of claim 7, wherein the one or more processors, to tune back to the first wireless network, are configured to cause the multi-SIM UE to:
re-establish a radio resource control (RRC) connection with the apparatus of the base station.

22. A non-transitory computer-readable medium storing a set of instructions for wireless communication, the set of instructions comprising:
one or more instructions that, when executed by one or more processors of a multi-subscriber identity module (multi-SIM) user equipment (UE), cause the multi-SIM UE to:

receive, from an apparatus of a base station, a request to perform a measurement associated with a target cell;
tune away from a first wireless network associated with a first subscription of the multi-SIM UE to a second wireless network associated with a second subscription of the multi-SIM UE after receiving the request and based at least in part on a paging message received during a paging occasion associated with the second subscription;
tune back to the first wireless network after tuning away from the first wireless network;
measure, after tuning back to the first wireless network and based on the request, a reference signal from the target cell to generate a measurement report; and
transmit the measurement report to the apparatus of the base station, outside of a scheduled measurement reporting occasion for the first wireless network,
wherein the measurement report is included in a first transmission in time after tuning back to the first wireless network.

23. The non-transitory computer-readable medium of claim 22, wherein the target cell includes a New Radio (NR) cell or a legacy cell.

24. The non-transitory computer-readable medium of claim 22, wherein the target cell is for a non-standalone network anchored by the first wireless network.

25. The non-transitory computer-readable medium of claim 22, wherein the target cell is for addition or handover within the first wireless network.

26. The non-transitory computer-readable medium of claim 22, wherein the one or more instructions further cause the multi-SIM UE to:

receive, based at least in part on transmitting the measurement report, a handover command or a message to add a cell.

27. A first apparatus for wireless communication, comprising:
means for receiving, from a second apparatus of a base station, a request to perform a measurement associated with a target cell;
means for tuning away from a first wireless network associated with a first subscription of the first apparatus to a second wireless network associated with a second subscription of the first apparatus after receiving the request and based at least in part on a paging message received during a paging occasion associated with the second subscription;
means for tuning back to the first wireless network after tuning away from the first wireless network;
means for measuring, after tuning back to the first wireless network and based on the request, a reference signal from the target cell to generate a measurement report; and
means for transmitting the measurement report to the second apparatus, outside of a scheduled measurement reporting occasion for the first wireless network,
wherein the measurement report is included in a first transmission in time after tuning back to the first wireless network.

28. The first apparatus of claim 27, wherein the target cell includes a New Radio (NR) cell or a legacy cell.

29. The first apparatus of claim 27, wherein the target cell is for a non-standalone network anchored by the first wireless network.

30. The first apparatus of claim 27, wherein the target cell is for addition or handover within the first wireless network.

* * * * *